United States Patent
Nakashima et al.

(10) Patent No.: US 7,020,321 B2
(45) Date of Patent: Mar. 28, 2006

(54) PATTERN DATA CONVERTING METHOD AND APPARATUS

(75) Inventors: Kazuhiro Nakashima, Kawasaki (JP); Hideo Tsuchiya, Kawasaki (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 705 days.

(21) Appl. No.: 10/106,344

(22) Filed: Mar. 27, 2002

(65) Prior Publication Data

US 2002/0141633 A1 Oct. 3, 2002

(30) Foreign Application Priority Data

Mar. 29, 2001 (JP) .................................. 2001-095304

(51) Int. Cl.
*G06K 9/00* (2006.01)

(52) U.S. Cl. .................. 382/144; 382/145; 382/147; 382/149; 382/282; 356/237.1; 700/121

(58) Field of Classification Search ............. 382/141, 382/145, 144, 147, 149, 151, 282; 348/86, 348/87, 125, 126; 356/237.1, 237.2, 237.5; 250/559.05, 559.06, 559.07; 700/110, 121; 702/35; 716/19
See application file for complete search history.

(56) References Cited

U.S. PATENT DOCUMENTS

| 4,504,969 A | * | 3/1985 | Suzuki et al. ............... 382/175 |
| 4,774,461 A | * | 9/1988 | Matsui et al. ............... 348/126 |
| 5,404,410 A | * | 4/1995 | Tojo et al. ................... 382/144 |
| 5,886,943 A | * | 3/1999 | Sekiguchi et al. ...... 365/230.03 |
| 6,285,783 B1 | * | 9/2001 | Isomura et al. ............. 382/147 |
| 6,598,185 B1 | * | 7/2003 | Matsui et al. ................ 714/48 |
| 6,674,889 B1 | * | 1/2004 | Takayama ................... 382/149 |

FOREIGN PATENT DOCUMENTS

JP 11-194480 7/1999

* cited by examiner

*Primary Examiner*—Bhavesh M. Mehta
*Assistant Examiner*—John Strege
(74) *Attorney, Agent, or Firm*—Oblon, Spivak, McClelland, Maier & Neustadt, P.C.

(57) ABSTRACT

A pattern data converting method comprises reconstructing the design data into column regions, segmenting the column region into apparatus strips, and extracting unit data of the design data for each apparatus strip, wherein reconstructing the design data includes defining an rectangular region start code and a rectangular region end code to the rectangle regions, collating the rectangular region start and end codes, dividing the rectangular regions at the Y coordinate of the other rectangular region, and subjecting the rectangular region start code and rectangular region end code having the same Y coordinates to the region operation.

20 Claims, 19 Drawing Sheets

Procedure 1: Each region is represented by vector data. The start position is an upward vector and the end position is a downward vector.

Procedure 2: Divide vectors at Y coordinate so that the vectors have the same length.

Procedure 3: Represent the upward vector as 1 and the downward vector as -1 for each slit, and accumulate the vectors in the direction of X coordinate to remain only upward vectors of 1 and downward vectors of 0.

Procedure 4: Convert the vectors into region information. In this time, the regions having the same X coordinate and the same length in the adjacent slits are combined.

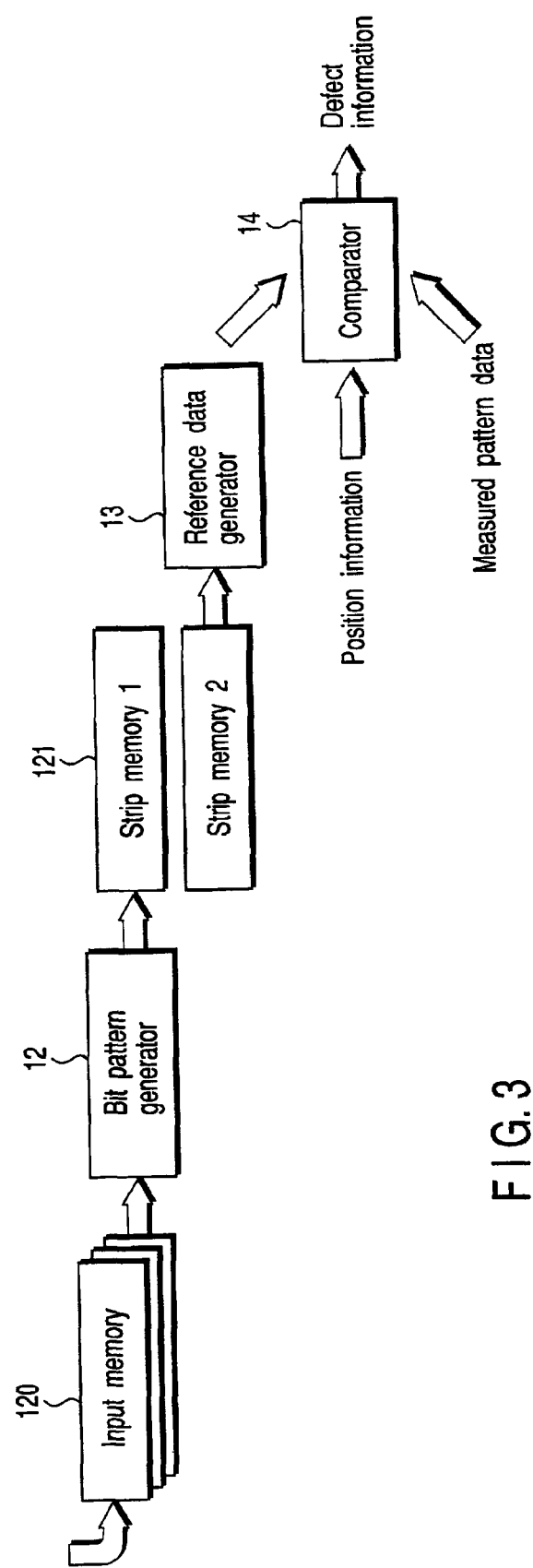
F I G. 3

Procedure 1: Each region is represented by vector data. The start position is an upward vector and the end position is a downward vector.

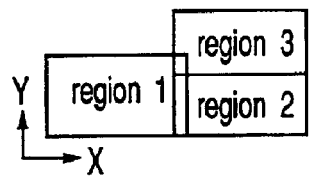 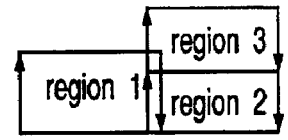

Procedure 2: Divide vectors at Y coordinate so that the vectors have the same length.

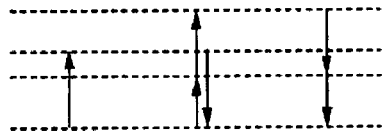 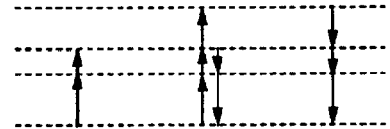

Procedure 3: Represent the upward vector as 1 and the downward vector as -1 for each slit, and accumulate the vectors in the direction of X coordinate to remain only upward vectors of 1 and downward vectors of 0.

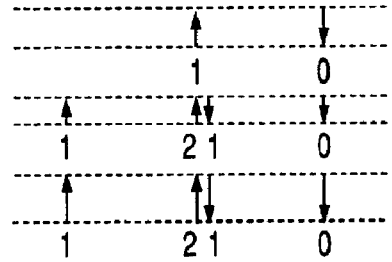 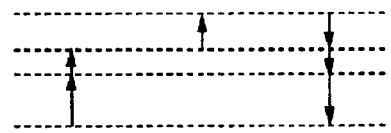

Procedure 4: Convert the vectors into region information. In this time, the regions having the same X coordinate and the same length in the adjacent slits are combined.

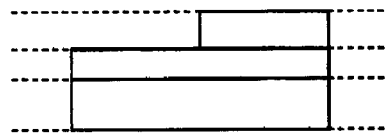 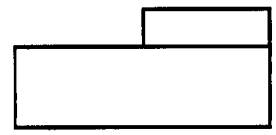

FIG. 9

Procedure 1: Each region is represented by vector data. The start position of non-reduction region is represented as the upward vector and the end position thereof as the downward vector. The start position of a reduction region is represented as the downward vector and the end position thereof as the upward vector.

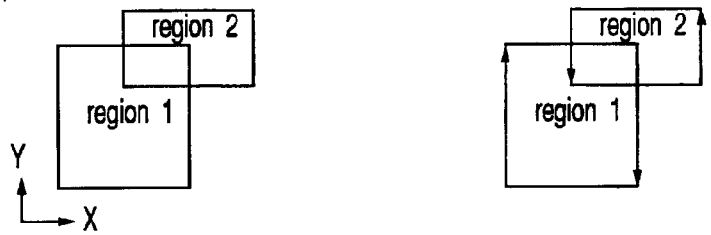

Procedure 2: Divide vectors at Y coordinate so that the vectors have the same length.

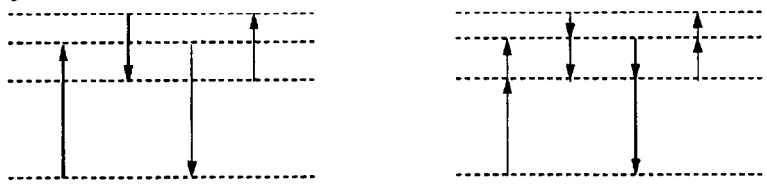

Procedure 3: Represent the upward vector as 1 and the downward vector as -1 for each slit, and accumulate the vectors in the direction of X coordinate to remain only upward vectors of 1 and downward vectors of 0.

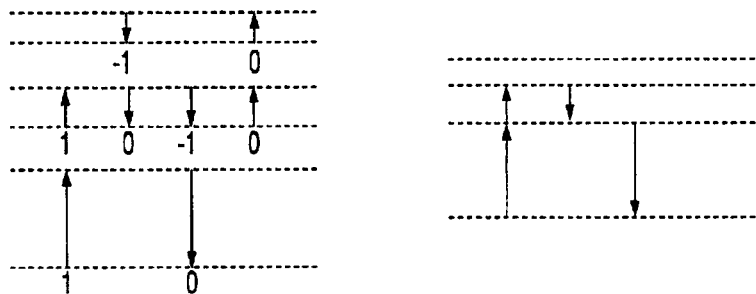

Procedure 4: Convert the vectors into region information. In this time, the regions having the same X coordinate and the same length in the adjacent slits are combined.

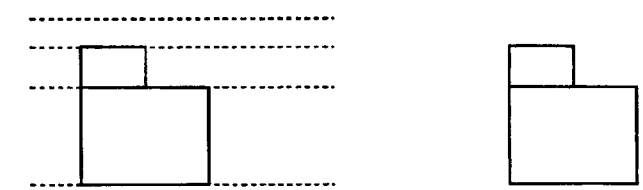

FIG. 10

Procedure 1: Each region is represented by vector data. The start position is an upward vector and the end position is a downward vector.

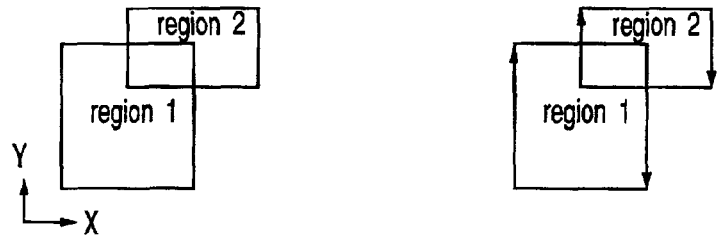

Procedure 2: Divide vectors at Y coordinate so that the vectors have the same length.

Procedure 3: Represent the upward vector as 1 and the downward vector as -1 for each slit, and accumulate the vectors in the direction of X coordinate to remain only upward vector of 2 and downward vectors of 1.

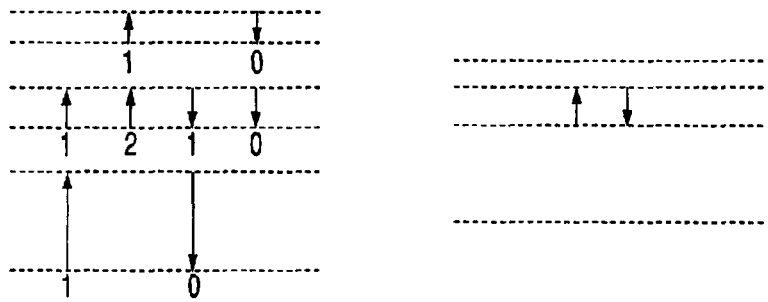

Procedure 4: Convert the vectors into region information. In this time, the regions having the same X coordinate and the same length in the adjacent slits are combined.

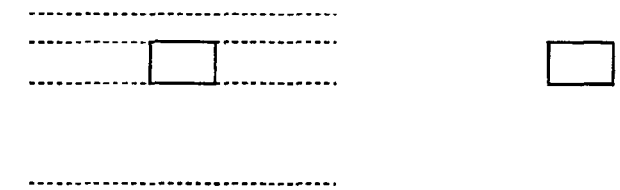

FIG. 11

Design data

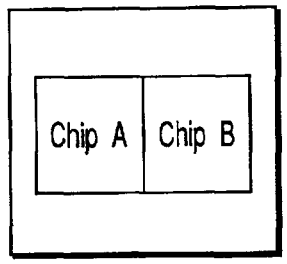

FIG. 13A

Column region generation
Generate the column region using region operation (OR operation)

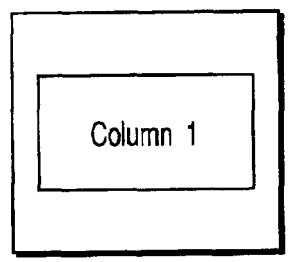

FIG. 13B

Comparison with the conventional apparatus in point of the inspection time
Ta : Inspection time of the region of chip A
Tb : Inspection time of the region of chip B
 r : Stage shuttle time    R : Stage movement time
 C : Column region generating time    S : Strip region generating time
Ts1 - Tsn : Times required for generating first to n-th inspection strip data

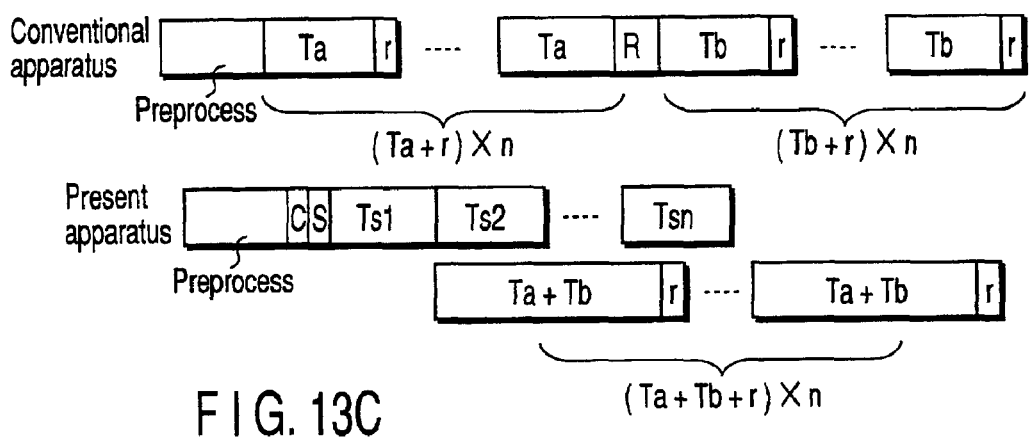

FIG. 13C

Design data (including different kinds of chips)
Data generation condition of chip C differs from other chips (A and B)

Column region generation
Only the chips having the same data generation condition are extracted to generate respective column regions Design data
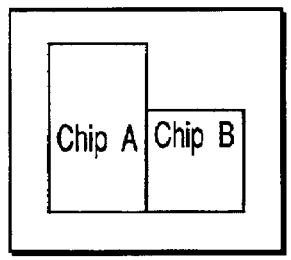 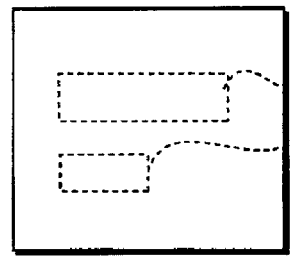
FIG. 15A  FIG. 15B
Column region generation
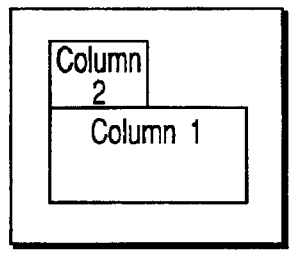
FIG. 15C
Subject column region and designated region to AND operation
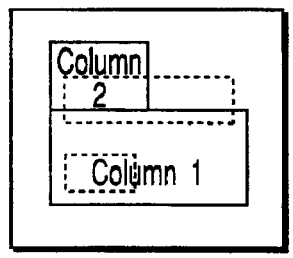 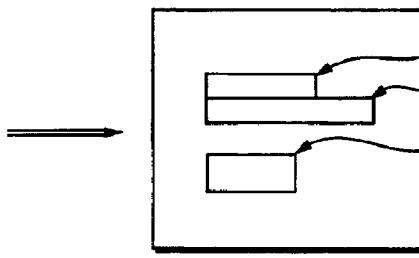
FIG. 15D Design data
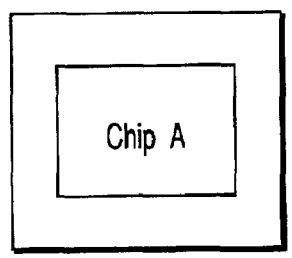
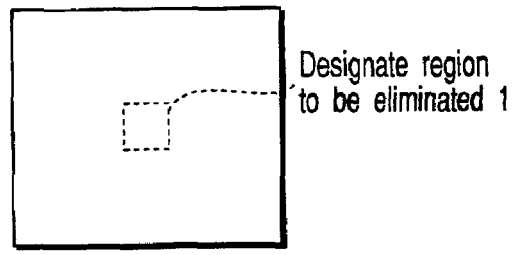
FIG. 16A          FIG. 16B
Column region generation
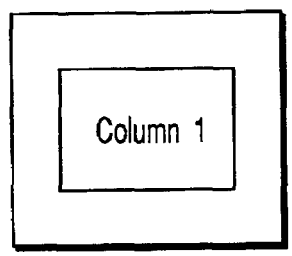
FIG. 16C
Perform region subtraction (column region - inspection elimination region)
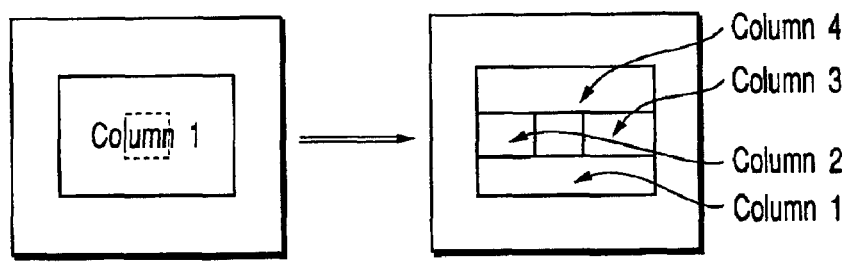
FIG. 16D Design data Enlarge each chip region by a desired size Column region generation Design data
(chips A and B differ in generation
condition from each other)

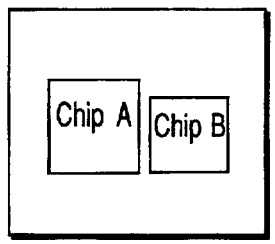

FIG. 18A

Column region generation
Extract chips having the same generation
condition and generate respective column
regions by enlarging the chips by the
desired size

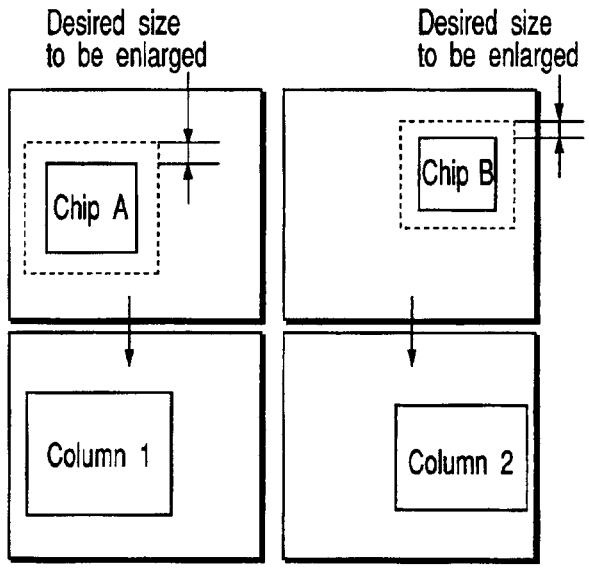

FIG. 18B

Determine the different kind of chip
as elimination region and subject
the column regions to region subtraction

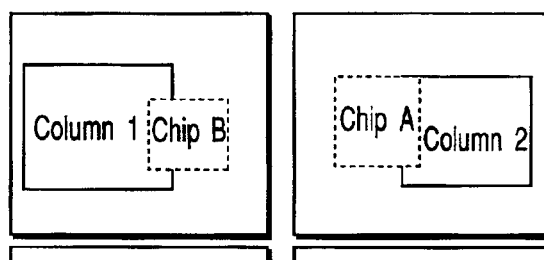

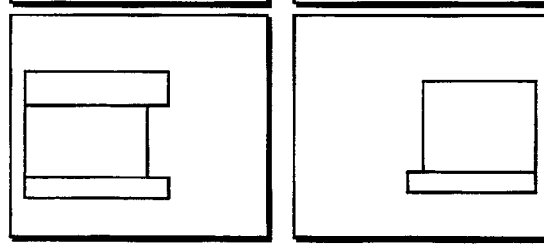

FIG. 18C

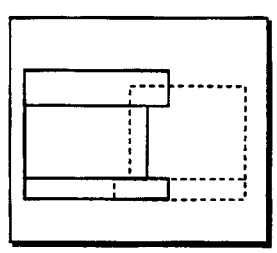

Combine the column
regions and eliminate
the column region 2
from the column region
1 or vise versa

FIG. 18D

Column 5
Column 3  Column 4
Column 1  Column 2

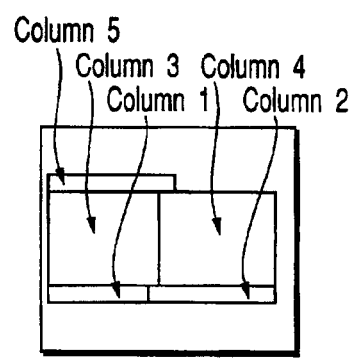

FIG. 18E

PATTERN DATA CONVERTING METHOD AND APPARATUS

CROSS-REFERENCE TO RELATED APPLICATIONS

This application is based upon and claims the benefit of priority from the prior Japanese Patent Application No. 2001-095304, filed Mar. 29, 2001, the entire contents of which are incorporated herein by reference.

BACKGROUND OF THE INVENTION

1. Field of the Invention

The present invention relates to a pattern data converting method and a data converting apparatus employed by a semiconductor manufacturing apparatus and a pattern inspection apparatus which use numeric data, particularly, a pattern data converting method and a pattern data converting apparatus which are used for drawing or inspecting photomasks which are employed in manufacturing semiconductor devices and liquid crystal display panels or patterns formed on wafers or liquid crystal boards.

2. Description of the Related Art

Generally, in a pattern drawing apparatus and a pattern inspection apparatus, a photomask is arranged on a X-Y stage, and an electron beam while moving this stage scans the entire surface of the photomask. In this time, the design data read into the drawing apparatus or inspection apparatus is used in a form of plural design strip regions obtained by dividing rectangular region data, i.e., chip data. In other words, in a conventional data converting method used for the conventional drawing apparatus or inspection apparatus, design chip data is stored in a magnetic disc of a computer and the like, and the process till the design chip data are cut out into strip data for the apparatus is performed by software on the computer. This strip data is output to the hard input memory of the receptacle port of hardware. The strip data of this input memory is subjected to hardware process such as pattern generation and shot pattern generation.

It is difficult to describe data of the mask entire surface in one chip in a mass since the method of describing the design data of a LSI pattern becomes more and more complicated. For this reason, a method for arranging and coupling plural chip data is necessary for drawing and inspection of one mask. However, merely converting of such data makes the number of shuttles of the stage in the drawing and inspection increase. Further, the design data has to be remade in order to reduce the number of shuttles of the stage, and shorten the drawing time and inspection time. However, many time and labor are necessary to remake design data. Accordingly, the design data remaking is difficult substantially.

BRIEF SUMMARY OF THE INVENTION

It is an object of the present invention to provide a data converting method that can eliminate the shuttle time of the stage by reconstructing data in the inside of a drawing apparatus and an inspection apparatus without remaking design data.

Further, it is another object of the invention to provide a pattern drawing apparatus or a pattern inspection apparatus, which use the data converting method.

According to an aspect of the present invention, there is provided a pattern data converting method for generating pattern data having a desired strip width using design data representing plural rectangular regions, the method comprising: reconstructing the design data into a column region penetrating through adjacent ones of the rectangular regions in a column direction by a region operation for matching the adjacent ones of the rectangular regions with each other in length; segmenting the column region into apparatus strips; and extracting unit data of the design data for each of a plurality of apparatus strips capable of being processed in a time, wherein reconstructing the design data includes: defining a rectangular region start code having first and fourth vertex coordinate (X1, Y1) and (X1, Y2) and a rectangular region end code having second and third vertex coordinates (X2, Y1) and (X2, Y2) to the rectangle regions, where the column direction is X and a direction perpendicular to the column direction X is Y, and the first to fourth vertex coordinates of each of the rectangular regions are (X1, Y1), (X2, Y1), (X2, Y2) and (X1, Y2), collating the rectangular region start code and the rectangular region end code of each of the rectangular regions with the Y coordinate of first to fourth vertexes of the other of the rectangular regions, dividing the rectangular regions at the Y coordinate of the other of the rectangular regions, and subjecting the rectangular region start code and rectangular region end code having the same Y coordinate to an operation, to obtain the column region.

According to another aspect of the present invention, there is provided a pattern inspection apparatus which inspects a pattern of an object comprising: a pattern data generator configured to generate pattern data corresponding to the pattern of the object; a reference data generator configured to generate reference pattern data based on design data; and a comparator which compares the pattern data with the reference pattern data to inspect a defect of the pattern of the object, the reference data generator including: means for reconstructing the design data into a column region penetrating through adjacent ones of the rectangular regions in a column direction by a region operation for matching the adjacent ones of the rectangular regions with each other in length; means for segmenting the column region into apparatus strips; and means for extracting unit data of the design data for each of a plurality of apparatus strips capable of being processed in a time, the means of reconstructing the design data including: means for defining a rectangular region start code having first and fourth vertex coordinate (X1, Y1) and (X1, Y2) and a rectangular region end code having second and third vertex coordinates (X2, Y1) and (X2, Y2) to the rectangle regions, where the column direction is X and a direction perpendicular to the column direction X is Y, and the first to fourth vertex coordinates of each of the rectangular regions are (X1, Y1), (X2, Y1), (X2, Y2) and (X1, Y2), means for collating the rectangular region start code and the rectangular region end code of each of the rectangular regions with the Y coordinate of first to fourth vertexes of the other of the rectangular regions, means for dividing the rectangular regions at the Y coordinate of the other of the rectangular regions, and means for subjecting the rectangular region start code and rectangular region end code having the same Y coordinate to an operation, to obtain the column region, and the pattern data generator including a stage on which the object is put, and a moving device which moves the stage to scan a region of the object which corresponds to the column region.

According to another aspect of the present invention, there is provided A drawing apparatus which draws a pattern on an object, comprising: a design data generator configured to generate design data including plural data representing plural rectangular regions; a reconstructing device configured to reconstruct the design data into column regions penetrating through adjacent ones of the rectangular regions in a column direction by a region operation for matching vectors of the adjacent ones of the rectangular regions with each other in length; a segmenting device configured to segment the column region into apparatus strips; an information extracting device configured to extract unit information of hierarchical description that constructs the design data for each of a plurality of apparatus strips capable of being processed in a time, to form pattern data having a desired strip width; and a drawing device configured to draw a pattern corresponding to the design data according to the pattern data on the object, the reconstructing device including: means for defining a rectangular region start code having first and fourth vertex coordinate (X1, Y1) and (X1, Y2) and a rectangular region end code having second and third vertex coordinates (X2, Y1) and (X2, Y2) to the rectangle regions, where the column direction is X and a direction perpendicular to the column direction X is Y, and the first to fourth vertex coordinates of each of the rectangular regions are (X1, Y1), (X2, Y1), (X2, Y2) and (X1, Y2), means for collating the rectangular region start code and the rectangular region end code of each of the rectangular regions with the Y coordinate of first to fourth vertexes of the other of the rectangular regions, means for dividing the rectangular regions at the Y coordinate of the other of the rectangular regions, and means for subjecting the rectangular region start code and rectangular region end code having the same Y coordinate to an operation, to obtain the column region, and the drawing device including a stage on which the object is put, and a moving device which moves the stage to scan a region of the object which corresponds to the column region.

BRIEF DESCRIPTION OF THE SEVERAL VIEWS OF THE DRAWING

FIG. 3 is a block diagram of a main configuration of the pattern inspection apparatus of FIG. 1;

FIG. 9 is a diagram for explaining a method of a region OR operation in a column region generation;

FIG. 10 is a diagram for explaining a method of the region subtraction in the column region generation;

FIG. 11 is a diagram for explaining a method of a region AND operation in the column region generation;

FIGS. 13A to 13C are diagrams for explaining the column region generation and inspection processing time according to the first embodiment;

FIGS. 15A to 15D are diagrams for explaining the column region generation according to the third embodiment;

FIGS. 16A to 16D are diagrams for explaining the column region generation according to the fourth embodiment;

FIGS. 18A to 18E are diagrams for explaining the column region generation according to the sixth embodiment;

DETAILED DESCRIPTION OF THE INVENTION

Embodiments of the present invention will hereinafter be described in detail with reference to the accompanying drawings.

Figure 1:
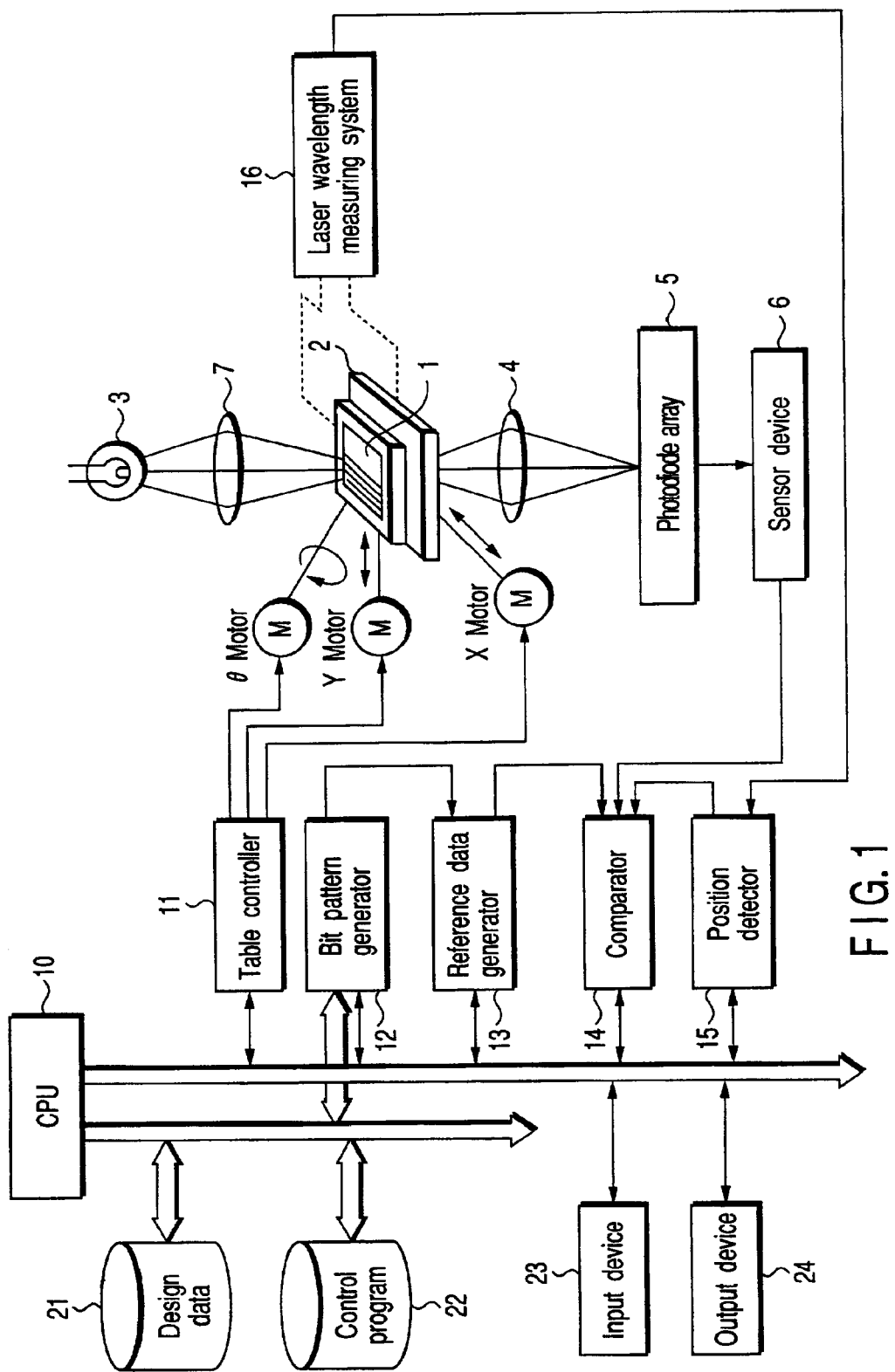
FIG. 1 is a schematic diagram of a pattern inspection apparatus employed by each embodiment of the present invention.

FIG. 1 shows a pattern inspection apparatus, which is employed in each embodiment of the present invention. According to this, an object to be inspected (photomask) 1 is put on an object carriage (XYθ table) 2. The object carriage 2 is moved in X and Y directions and rotated in a θ direction by a table controller 11 receiving instructions from a CPU 10. The position coordinate of the object carriage 2 is measured by a laser wavelength system 16 whose output is sent to the position circuit 15. The position coordinate output from the position circuit 15 is fed back to the table controller 11.

A light source 3 is disposed above the object carriage 2. The light from this light source 3 is irradiated on the photomask 1 through a condenser lens 7. The light that passed through the photomask 1 and object carriage 2 forms an image on the light receiving face of a photoelectric conversion device, e.g., photodiode array 5 by means of a magnifying optical system 4. The photodiode array 5 detects a measurement signal corresponding to the object pattern of the photomask 1.

The measurement signal corresponding to the object pattern is read out from the photodiode array 5 in synchronism with a clock frequency of several tens MHz. The measurement signal is converted to digital data by a sensor circuit 6. The digital data is sent as measurement pattern data to a comparator 14 after alignment by a line buffer. The measurement pattern data is the data of, for example, 8 bits having no sign, and expresses luminosity of each pixel. In addition, position information of a measurement point is input to the comparator 14 from the position circuit 15, too.

The comparator 14 compares inspection reference pattern data with the measurement pattern data according to an appropriate algorithm such as level comparison or comparison of differentiation value to determine a defect. CPU 10 fetches information of the detected defect. The fetched Information includes the coordinate at which the defect occurs and the measurement pattern data and inspection reference pattern data of the defect occurrence, the defect classification determined by the comparator 14. The information is displayed on an output device 24 such as a display unit under inspection progress or after inspection completion or saved in storage media such as hard disk.

The pattern inspection apparatus relating to the present embodiment has a hard disk 21 storing the design pattern data, a hard disk 22 storing the pattern check program, an input device 23 receiving input data such as data or instruction from an operator, an output device 24 outputting a test result and so on.

Figure 2A:
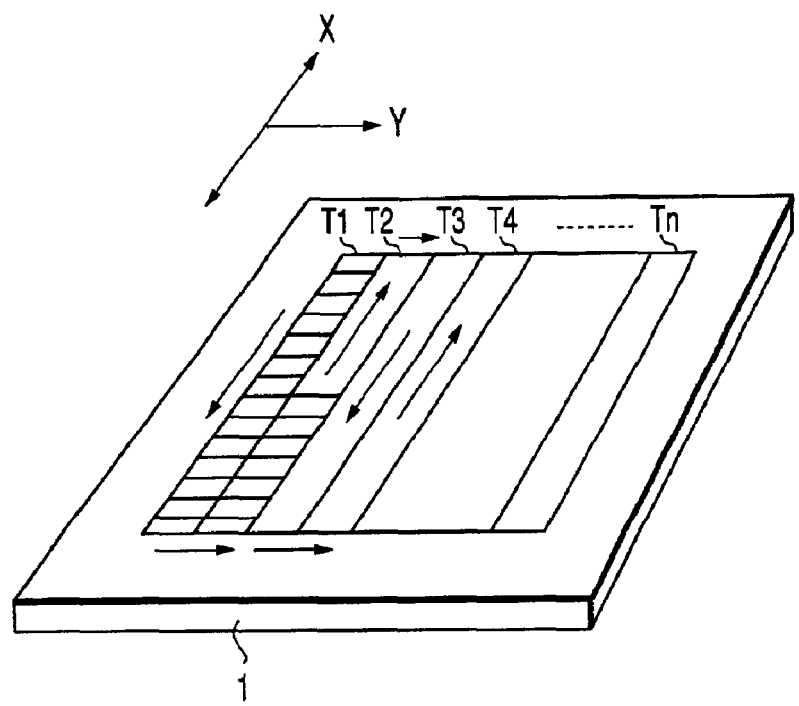
FIGS. 2A and 2B show diagram for explaining a method of inspecting an object.
Figure 2B:
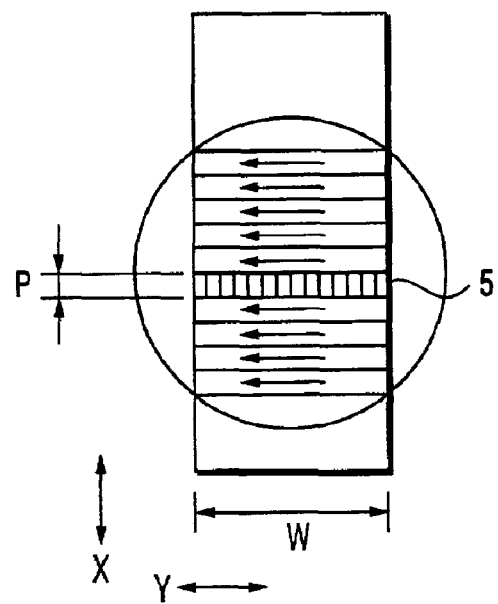

The process regarding the measurement pattern data is executed using a long strip apparatus strip having a suitable strip width and a chip length perpendicular to the strip width as transaction. In other words, as shown in FIG. 2A, a pattern on an object to be measured is divided into long strips T1, T2, T3, . . . , Tn. In this time, the stage is continually moved as shown in the X direction arrow to capture a mask pattern corresponding to each strip, and the pixels of the photodiode array in the Y direction is scanned and fetched. More concretely, W number of pixels of the photodiode array are scanned while the stage moves the object carriage continually in the X direction in a section of the width P of one pixel as shown in FIG. 2B. When the object carriage is moved in the X direction by the length of the strip, the strip T1 is scanned. Similarly, the strips T2, T3, . . . , Tn are scanned by return as shown in FIG. 2A.

FIG. 2B shows a method for forming an image passed through the mask or an image reflected from the mask on the photodiode array 5 by irradiating light in a certain range of the mask 1. However, there may be used a method of detecting light passed through the mask or reflected therefrom by irradiating a beam of size corresponding to the dimension of the defect on the mask. In this case, the beam of dimension covering a region for roughly one pixel is irradiated on the mask. The pixels of the strip width W are scanned to detect light passed through the mask or reflected therefrom while the object carriage moves continuously by only a section p in the direction (X).

As thus described, in the inspection operation, the continuous movement of the stage in the X direction and the scanning of the photodiode array must be synchronized without a break. The database based inspection apparatus must generate inspection reference data having an enough timing margin as against the acquisition velocity of the detected pattern so that the comparator doe° Cs not cause a comparison timing error.

The process for generating the reference pattern from the design data is executed by the hardware of a dedicated circuit in order to get an enough processing speed. Since the design chip data is stored in the magnetic disc 21 of the computer and the like, the process to the process for cutting and bringing down in the strip data is executed by the software on the computer, and the strip data outputs to the hard input memory of the input port of hardware.

FIG. 3 is a block diagram of the pattern inspection apparatus according to the present embodiment. The strip data stored in the hard input memory 120 is converted to the bit pattern by the bit pattern generator 12 and is sent to the strip memory 121 as pattern image data.

In the present embodiment, the plural strip memories 121 are provided between the bit pattern generator 12 and reference data generator 13 as shown in FIG. 3. Each of the strip memories 121 can store pattern image data for one strip. Therefore, the bit pattern generator 12 can convert the pattern image of the next strip region by background processing in inspection. This uses the performance of the bit pattern generator 12 in the maximum, The bank changing control of the hard input memory 120 in process of the pattern data converting became easy due to the background processing. In other words, one strip data can be divided into plural data items and stored into plural banks of the hard input memory 120.

The bit pattern generator 12 converts the strip data in the hard input memory 120 and generates bit pattern data as the inspection reference data in the strip memory 121. This bit pattern data is sent to the reference data generator 13 as image data. The whole data are subjected to the blurring process and the like considering measurement errors and so on. The data subjected to the blurring process is sent to the comparator 14 as final inspection reference pattern data.

Figure 4:
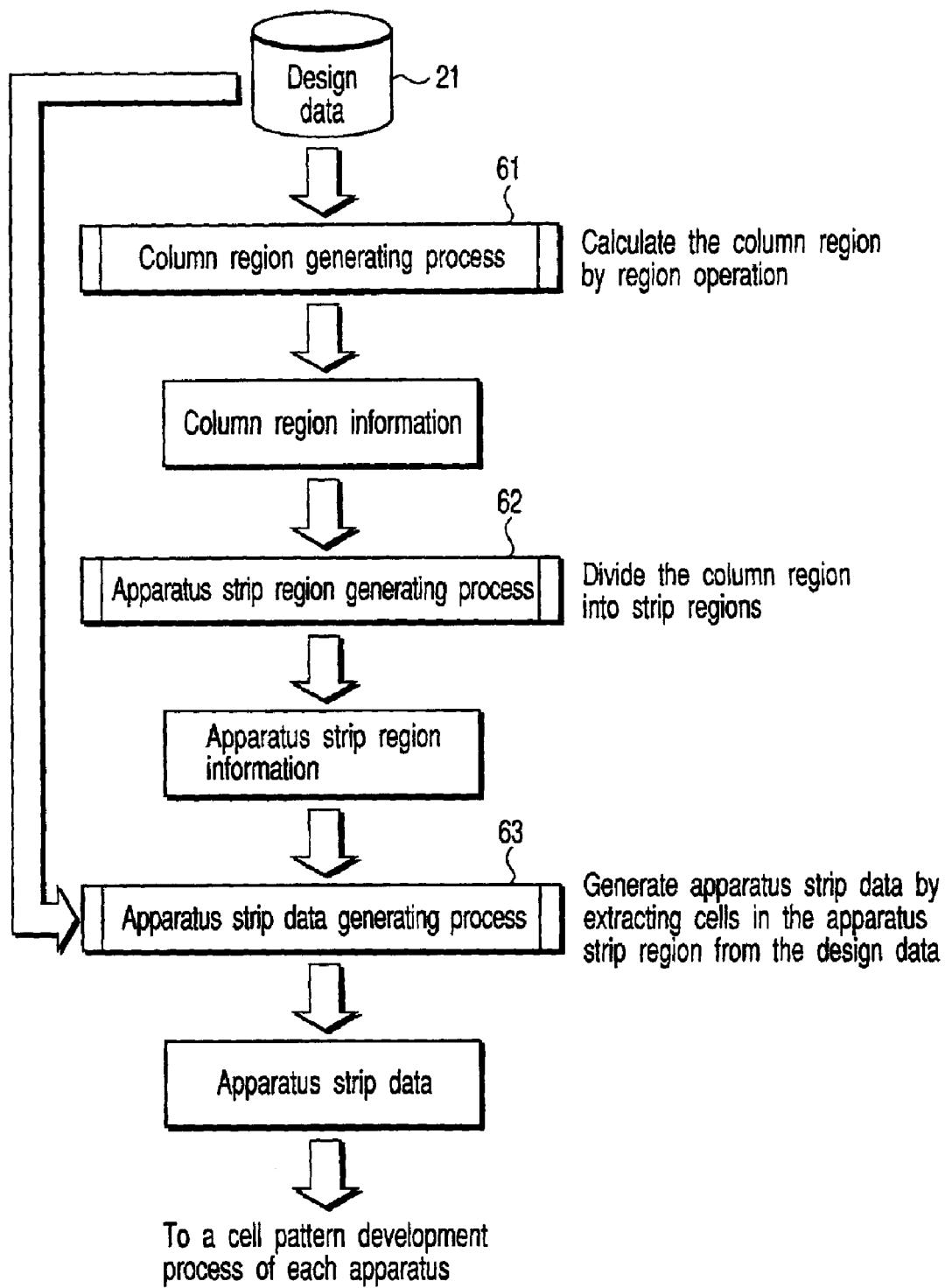
FIG. 4 is a flowchart for explaining a process of the data converting method according to the embodiment of the present invention.
Figure 5:
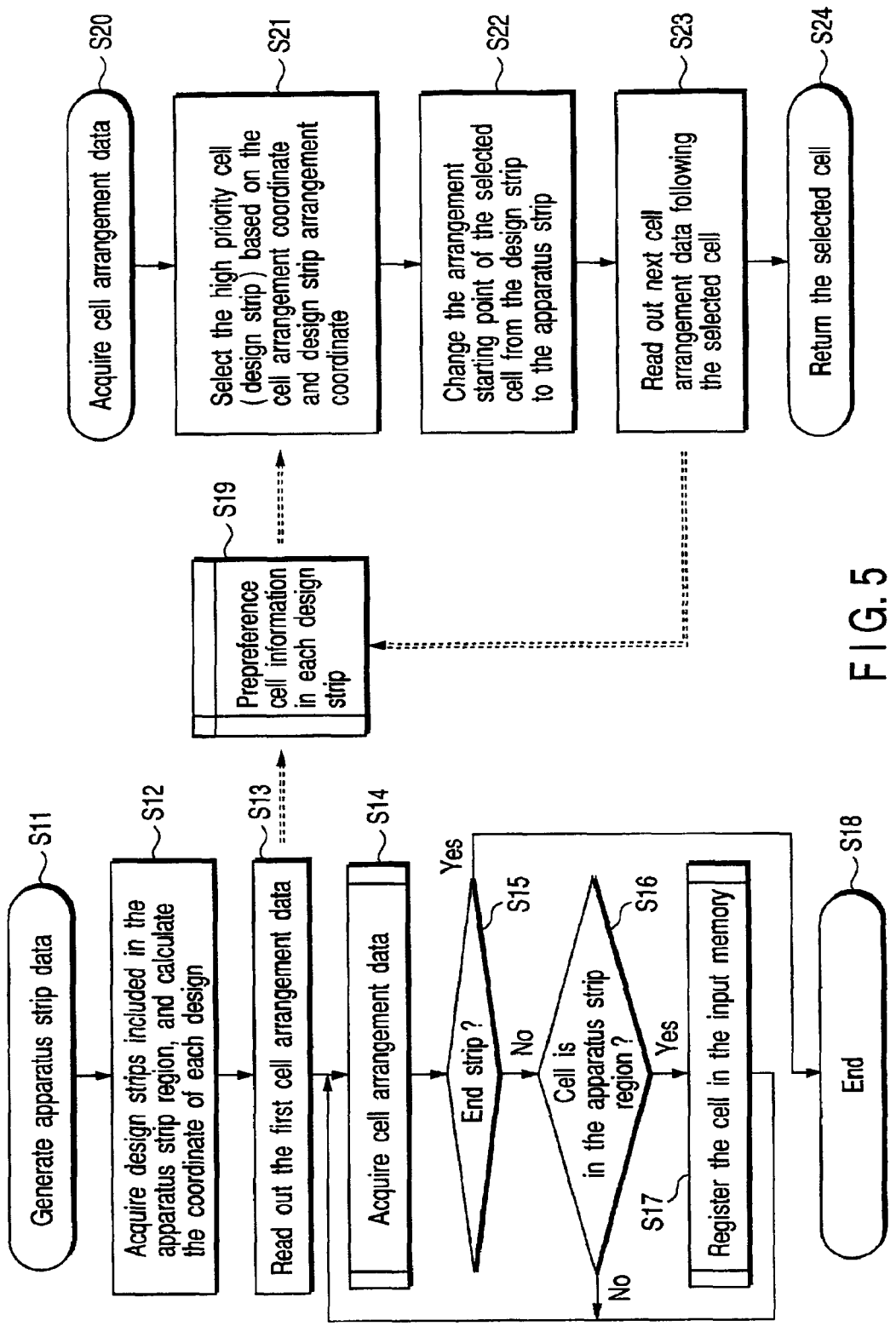
FIG. 5 is a flowchart for explaining a strip data generation method according to the embodiment of the present invention.
Figure 6:
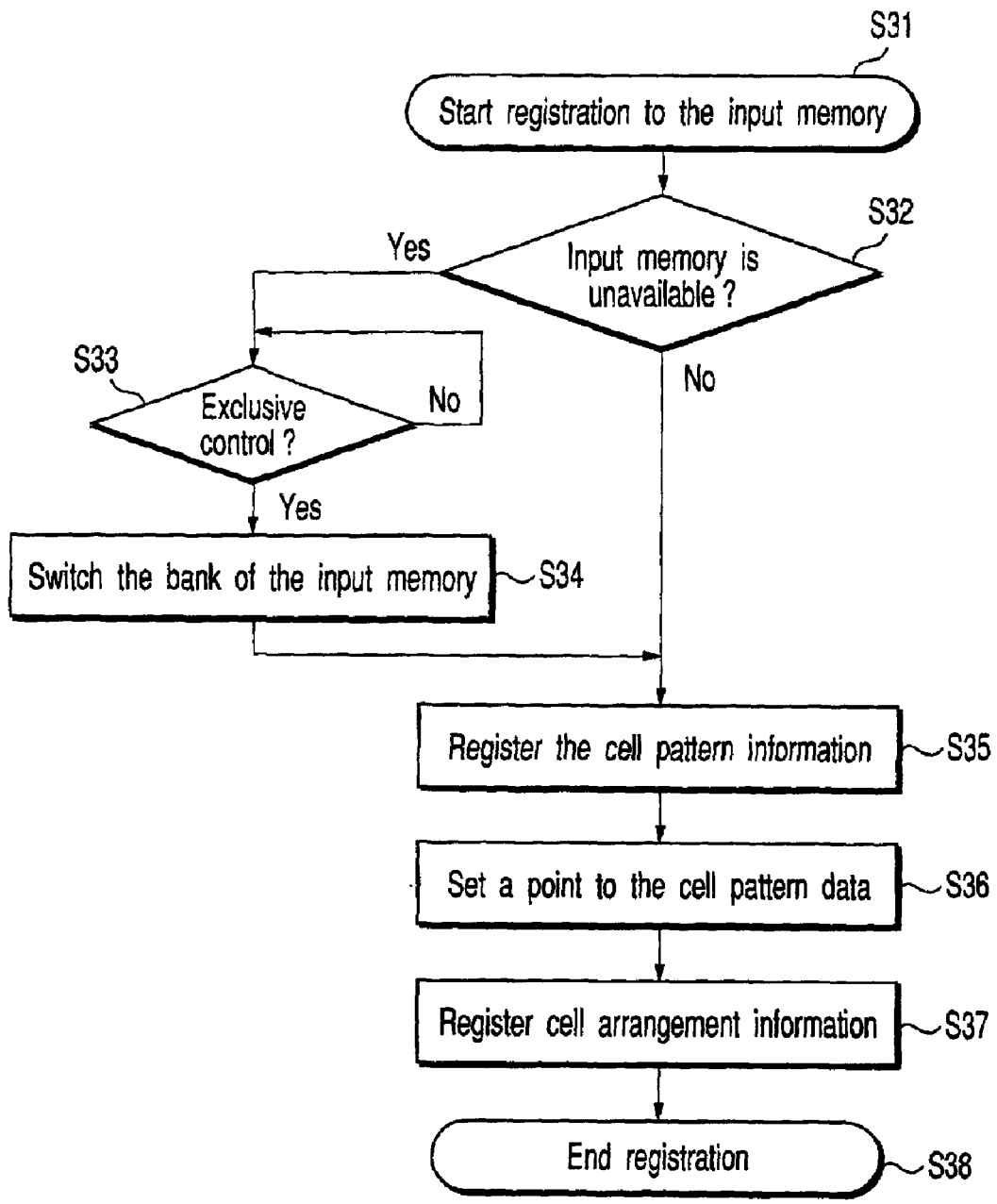
FIG. 6 is a flowchart for explaining a strip data generation method according to the embodiment of the present invention.

The flow of data converting method in the present embodiment is shown in FIG. 4, and the flowchart for generating the strip is shown in FIGS. 5 and 6. It differs from the conventional apparatus that the present apparatus is provided with a column region generating process 61, a strip region generating process 62 and a strip data generating process 63. These processes can be executed in the host computer (CPU) 10, so that the basic configuration of the pattern inspection apparatus based on the present embodiment is approximately common to the conventional pattern inspection apparatus.

The format of the design data, the flow of the data converting method, the column region generating process, the strip region generating process, and the strip data generating process will be described hereinafter.

[Format of Design Data]

At first, the design data used in the data converting method of the present embodiment (and stored in the hard disk 21) will be described.

Figure 8A:
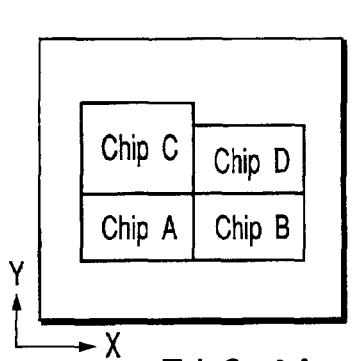
FIGS. 8A to 8E are diagrams showing a format of design data according to the embodiment of the present invention.
Figure 8B:
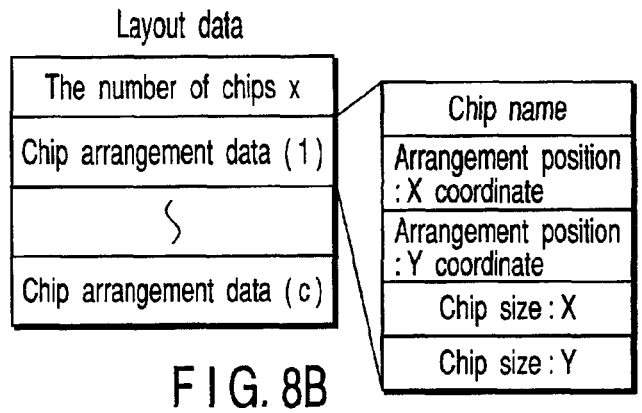
Figure 8C:
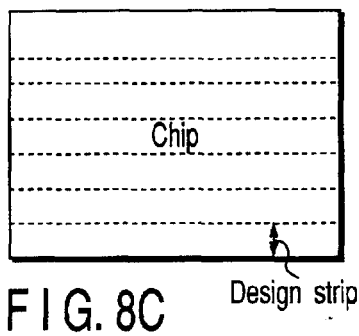

The design data comprises data (chip data) every rectangular region (chip) and data (layout data) for arranging the chip as shown in FIG. 8A. The layout data represents the layout position and chip dimension of each chip as shown in FIG. 8B. The chip data is a set of strip data (apparatus strip data) independent every strip region (strip) as shown in FIG. 8C. This refers to as design strip data in order to distinguish from the strip data (apparatus strip data) in column described below.

Figure 8D:
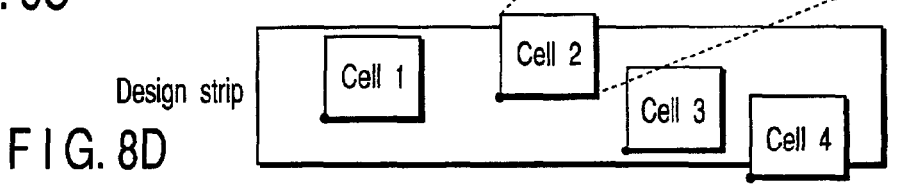

The design strip data has a structure to arrange cells each representing a set of pattern data as shown in FIG. 8D, and comprises a cell layout data section including a set of cell layout data and a cell pattern data section including a set of cell pattern data as shown in FIGS. 8A. The cell layout data includes a layout position of the cell in the design strip and a pointer to the cell pattern data. The cell pattern data indicates a set of the pattern data arranged in the cell. The pattern data represents a pattern position, a shape and a size in the cell.

[Flow of Data Converting Method]

Figure 7A:
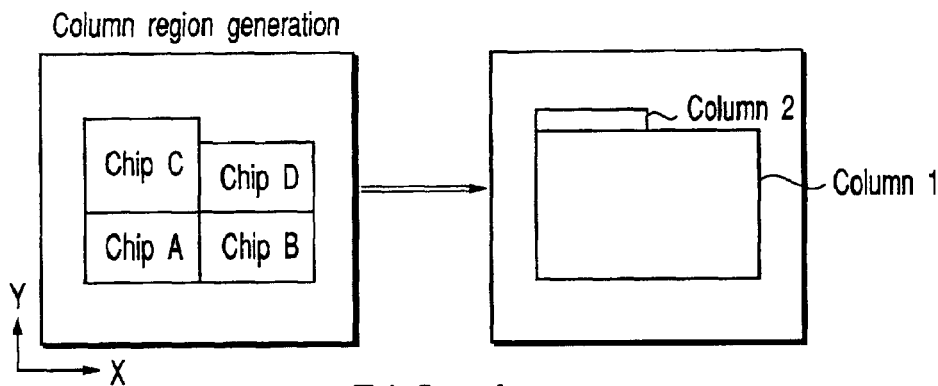
FIGS. 7A to 7E are diagrams for explaining a concept of the data converting method according to the embodiment of the present invention.
Figure 7C:
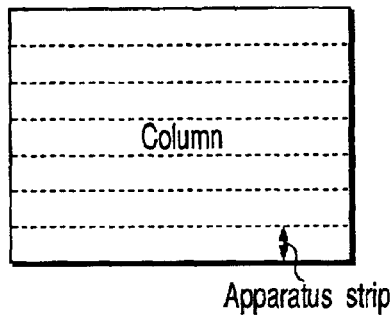
Figure 7B:
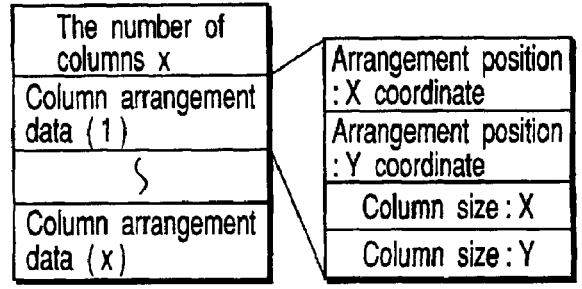

The column region generating process 61, the strip region generating process 62, and the strip data generating process 63 as shown in FIG. 4 perform the data conversion. The column region generating process 61 generates column region data from the layout data in the design data. The process 61 extracts from the design data the region (column region) having no boundary in the movement direction of the stage as shown in FIG. 7A. The column region data has a data format shown in FIG. 7B. This column region is reconstructed column region obtained by reconstructing adjacent chip regions in the design data in the column region. The apparatus strip region generating process 62 divides each column region into a plurality of strips (apparatus strip regions) capable of being processed in one time of movement of the stage (FIG. 7C). The apparatus strip data generating process 63 extracts the cells arranged in each apparatus strip region from the design strip data, to generate the apparatus strip data. The apparatus strip data is written in the hardware input memory of the apparatus. The data may be transferred from a bus provided on the computer such as PCI bus or VME bus using an appropriate interface.

The data stored in the hardware input memory of the apparatus is read out by the circuit hardware of the apparatus or a board computer in which software program is installed, and send to the drawing apparatus, pattern inspection apparatus, etc.

The column region generating process 61, the strip region generating process 62, and the strip data generating process 63 may be executed by the software installed in an independent computer or, for example, a board computer built in the present apparatus.

[Column Region Generating Device]

The column region generating process 61 is a program for obtaining a region (column region) having no boundary in the movement direction of the stage by region-operating the layout data (FIG. 8B) included in the design data. The column region generating process 61 has functions of OR operation of the region, subtraction thereof, and AND operation thereof, and can execute combination of these operations and repetition thereof.

The region operation method will be described as follows.

<Region or Operation>

The region OR operation will be described in accordance with an example shown in FIG. 9. The lateral direction is indicated as an X-axis, and the vertical direction as a Y-axis.

Procedure 1

The starting position (smaller X coordinate) of each region is expressed by XY coordinate and upward vector of Y length, and the end position (larger X coordinate) is expressed XY coordinate and downward vector of Y length.

Procedure 2

Each vector is divided by vertex coordinates (Y coordinates of the starting point and end point of the vector) of all vectors. In other words, the region divided into slit regions whose vector lengths equal.

Procedure 3)

Every slit, the upward vector is assumed as +1, and the downward vector as −1, the slits are accumulated from smaller X coordinate (from the upward vector in the case of the same coordinate). Only the upward vector that an accumulation result is 1 and downward vector that it is 0 are remained.

Procedure 4)

Vector representation is returned to region information expressed by the layout position and length of the side of the slit (XY coordinate and X length, Y length). The adjacent slits of the same X coordinate and X length are synthesized.

<Region Subtraction>

The region subtraction will now be described in accordance with an example shown in FIG. 10. The lateral direction is indicated as an X-axis, and the vertical direction as a Y-axis.

Procedure 1)

The starting position (smaller X coordinate) of the region to be subtracted is expressed by XY coordinate and upward vector of Y length, and the end position thereof (larger X coordinate) is expressed by XY coordinate and downward vector of Y length. The starting position of the subtraction region is expressed by XY coordinate and downward vector of Y length, and the end position thereof is expressed by XY coordinate and upward vector of Y length.

Procedures 2) to 4) perform the same processes as the region OR operation.

<Region AND Operation>

Region AND operation will now be described in accordance with an example shown in FIG. 11. The lateral direction is indicated as an X-axis, and the vertical direction as a Y-axis.

Procedures 1) to 2) perform the same processes as the region OR operation.

Procedure 3)

Every slit, the upward vector is assumed as +1, and the downward vector as −1, and the slits are accumulated from smaller X coordinate (from the downward vector in the case of the same coordinate). Only the upward vector that the accumulation result is 2 and downward vector that it is 1 are remained.

Procedure 4) perform the same processes as the region OR operation.

<Apparatus Strip Region Generating Process>

The strip region generating process 62 divides each column region into a plurality of strips (apparatus strip regions) capable of being processed in one time of movement of the stage (FIG. 7C). The apparatus strip region information is used for control of the stage (object carriage 2) and the kike other than generation of the apparatus strip data.

(Apparatus Strip Data Generating Process)

Figure 12:
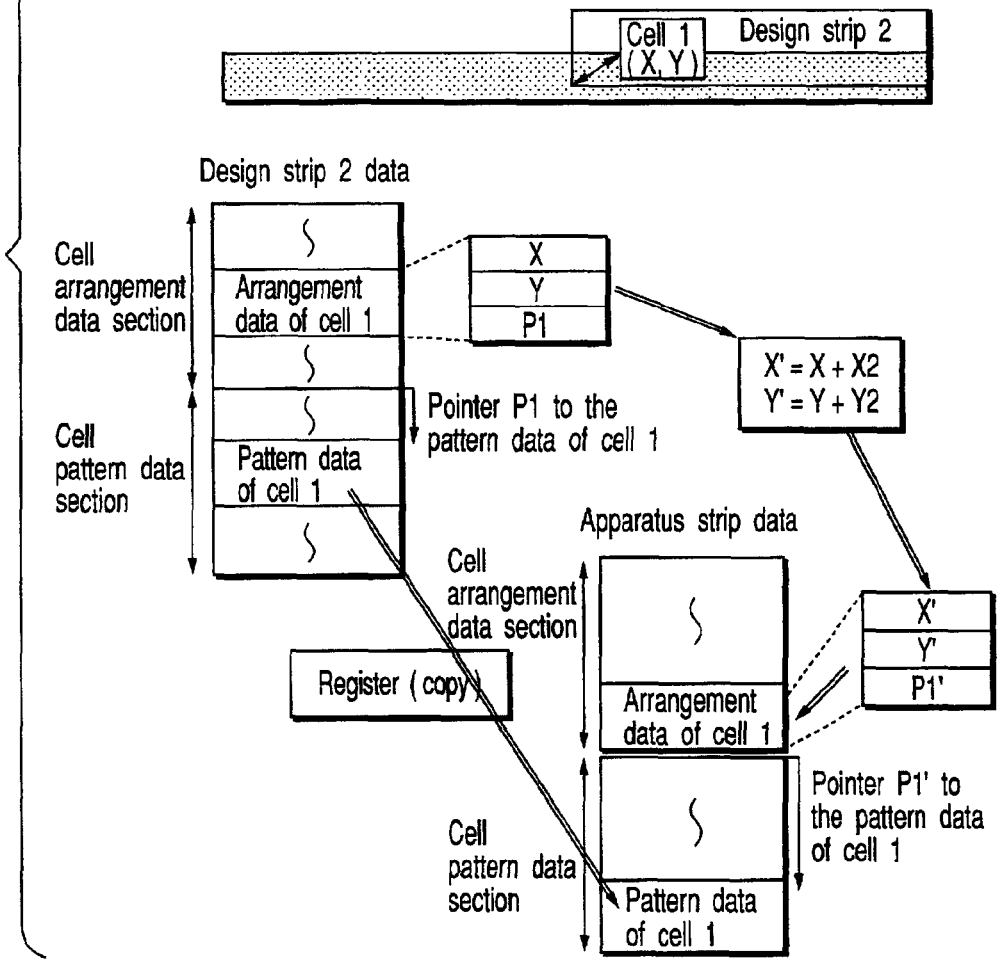
FIG. 12 is a diagram for explaining a strip data generation according to the embodiment of the present invention.

The concept of the apparatus strip data generating process is shown in FIG. 12.

Procedure 1)

The design strips are obtained from the apparatus strip region, and then the relative coordinates from the origins of the apparatus strips origin are calculated.

Procedure 2)

The cell information items of each design strip included in the apparatus strip are sequentially read, and the cell information items in the apparatus strip region are registered in the apparatus strip data. The contents of the cell pattern data are registered without being revised, and the layout coordinate of the cell layout data is transformed into a relative coordinate from the origin of the apparatus strip. This coordinate transformation is performed only by adding coordinates of the design strips obtained in procedure 1. The pointer to the cell pattern data of the cell layout data is directed to a registration destination in the apparatus strip data.

Figure 7D:
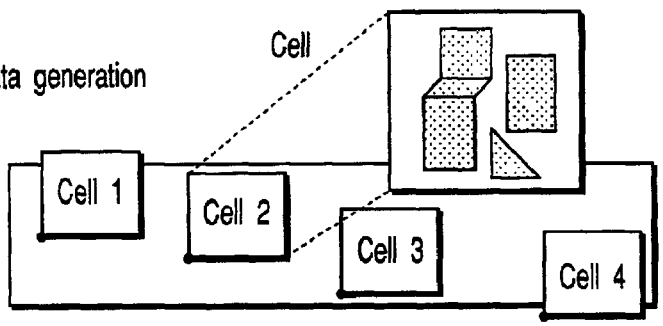
Figure 7E:
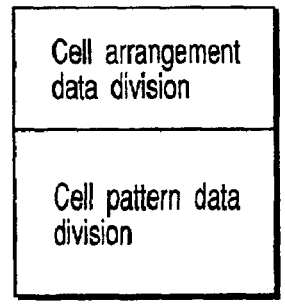
Figure 8E:
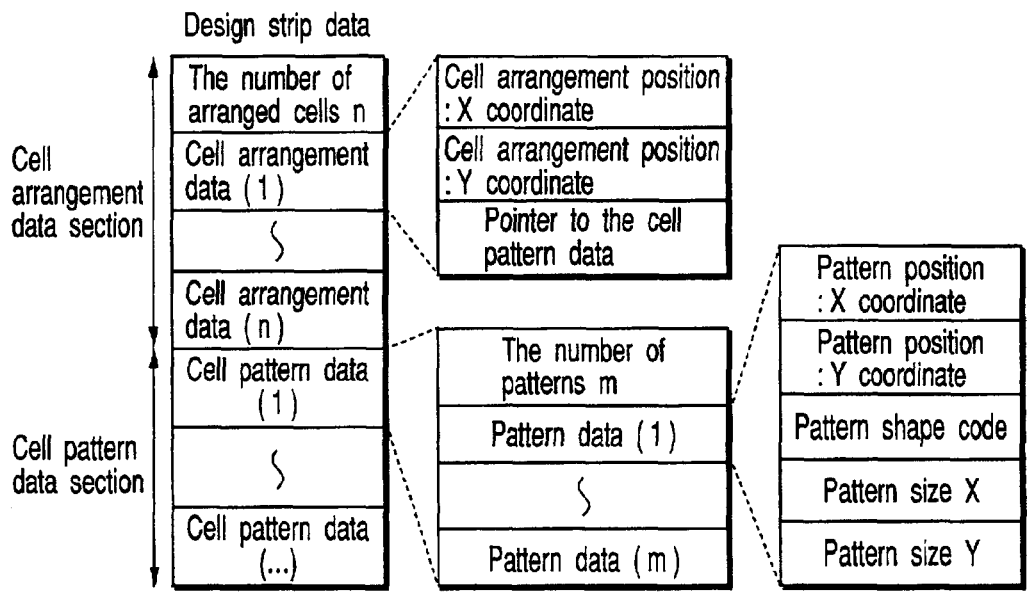

The apparatus strip has a structure that cells each representing a set of pattern data are arranged in the strip as shown in FIG. 7D, and comprises a cell layout data section including a set of cell layout data and a cell pattern data section including a set of cell pattern data as shown in FIG. 7E. In brief, the design strip data has the same structure as that of FIG. 8E.

There will now be described first to seventh embodiments of the present invention.

(First Embodiment)

At first, an example of the inspection apparatus using the converting method according to the embodiment of the present invention will be described.

As shown in FIG. 1, the pattern inspection apparatus relating to the present embodiment comprises a host computer (CPU) 10, an inspection data generator which generates inspection reference pattern data from the design data, i.e., the reference data generator 13, a measurement data generator, i.e., sensor circuit 6 which generates measurement pattern data corresponding to the photomask as the object 1, and the comparator 14 which compares the inspection reference pattern data with the measurement pattern data.

Figure 21:
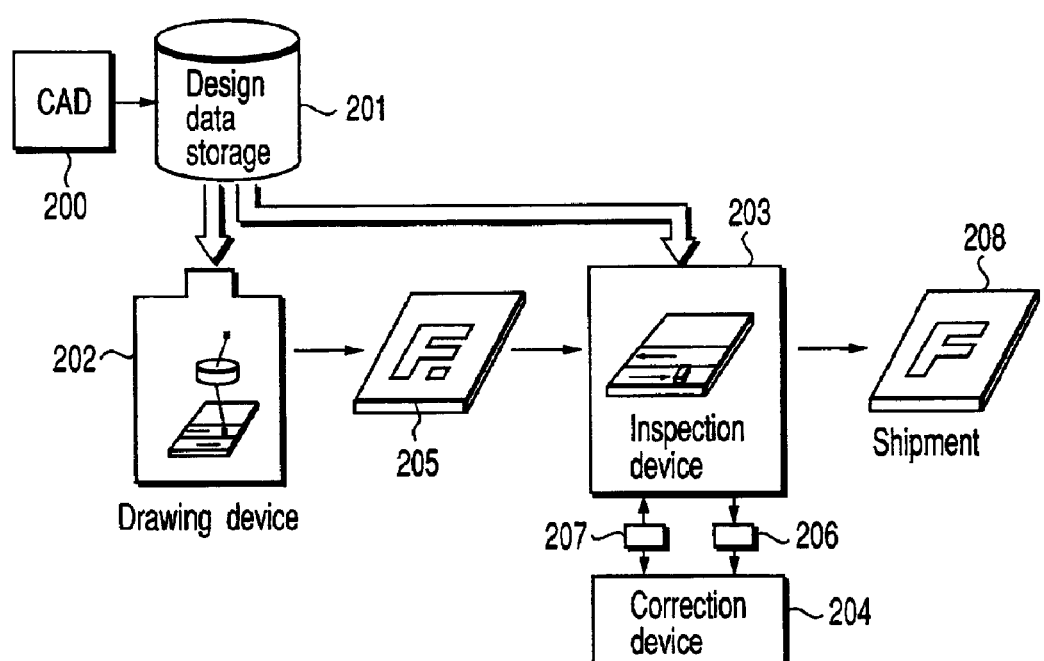
FIG. 21 is a diagram of explaining a process of a photomask manufacturing.

In the apparatus shown in FIG. 1, the design data stored in the hard disk 21 is data used in a conventional electron beam lithography apparatus 202 and pattern inspection apparatus 203 as shown in FIG. 21. The format of the design data is shown in FIGS. 8A to 8E. The column region generating process 61 generates a column region from this design data.

When comprising design data by plural chip data as shown in FIG. 13A, the column region generating process 61 generates the column region (FIG. 13B) using the function of the region OR operation. The strip region generating process 62 divides the column region into a plurality of strips (apparatus strip regions) capable of being inspected in one time of movement of the stage (FIG. 7C). The apparatus strip data generating process 63 extracts the cells arranged in the apparatus strip region, and generates the apparatus strip data in the hard input memory 120 (FIG. 3) of the bit pattern generator 12.

FIG. 13C shows comparison of the inspection time between a conventional pattern inspection apparatus and the pattern inspection apparatus of the present embodiment. The apparatus of the present embodiment needs processing time for the column region generation, apparatus strip region generation, and apparatus strip data generation, the processing time being not required in the conventional apparatus. However, since the process for generating the apparatus strip data on and after the second strip can be executed in parallel operation in the inspection operation, the extra processing time is only a part of the time intervals C, S, and Ts1 shown in FIG. 13C. This time interval can be shortened than the inspection time for one apparatus strip. In the example of FIG. 13, the number of shuttles of the stage of the present apparatus is reduced half that of the conventional apparatus.

When the chip size is 100 mm×100 mm, and the width of the apparatus strip is 200 µm (for the case the effective number of the pixels of the photodiode array is about 2000, and pixel size is 0.1 µm), the conventional apparatus has to scan 1000 apparatus strips, but this present apparatus has only to scan 500 apparatus strips. The shuffle time of the stage is one or two seconds, so that the time from 500 to 1000 seconds is shortened. When the design data includes a lot of chips arranged in the movement direction of the stage, or the pixel size is reduced in order to perform more highly precise inspection, the effect that the process time is shortened is further improved.

(Second Embodiment)

A column region generation method in the second embodiment will be described with reference to FIGS. 14A and 14B.

The first embodiment performs the region OR operation of all chip regions to obtain the column region. Therefore, the chips (different kinds of chips) that are different in data generation conditions (address unit or mirror) are arranged on the same column. In this case, the design strips of different data generation conditions are arranged on the apparatus strip region, so that a process for meeting data generation conditions is necessary for the apparatus strip data generating process 63. In other words, the apparatus strip data generating process 63 needs to transform individual pattern data in the cell pattern data. When this transformation is performed, the time for the apparatus strip data generation is prolonged largely. As a result, the processing time cannot be reduced. In this case, the column region is generated for each of the chips of the same data generation condition (chips of the same kind).

Figure 14A:
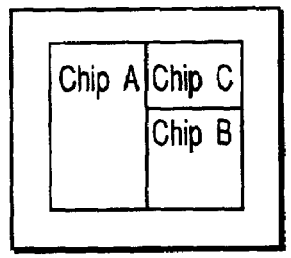
FIGS. 14A and 14B are diagrams for explaining the column region generation according to the second embodiment.
Figure 14B:
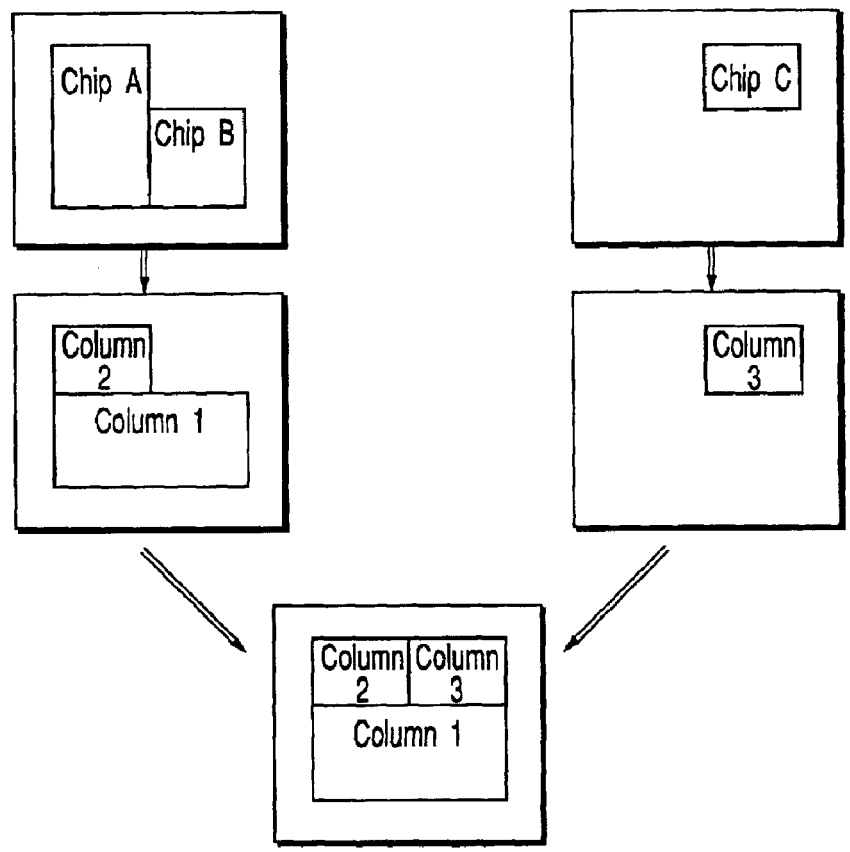

When the chip C among three kinds of chips A, B and C differs in data generation condition from the other chips as shown in FIG. 14A, column regions (column 1, column 2) are formed by regions of the chips A and B and a column region (column 3) by a region of the chip C as shown in FIG. 14B. Since the column 1 is processed penetrating through the chips A and B, this process can reduce the number of shuttles of the stage than the process performed every chip by the conventional apparatus.

(Third Embodiment)

A column region generating method of the third embodiment will be described with reference to FIGS. 15A to 15D.

The present embodiment provides a method of realizing a process for processing only one part of the design data without remaking the design data by means of the region operation for the column. When the design data shown in FIG. 15A is processed only about the regions specified as shown in FIG. 15B, the column regions are formed by the chip regions similarly to the above embodiments as shown in FIG. 15C. The specified region as shown in FIG. 15B and the region obtained by the region AND operation form actual column regions (columns 1 to 3) as shown in FIG. 15D.

(Fourth Embodiment)

A column region generating method of the fourth embodiment will be described with reference to FIGS. 16A to 16D.

The present embodiment provides a method of realizing a process for excluding only one part of the design data without remaking the design data by means of the region operation for the column. When from the design data shown in FIG. 16A is excluded only the region specified as shown in FIG. 16B, the column region is formed by the chip region similarly to the above embodiments as shown in FIG. 16C. The region obtained by subtracting the region shown in FIG. 16B includes real column regions 1 to 4 (FIG. 16D).

(Fifth Embodiment)

A column region generating method in the fifth embodiment will be described with reference to FIGS. 17A to 17C.

The present embodiment provides a method of realizing a process for processing at a time the peripheral parts of the chip included in the design data without remaking the design data by means of the column region operation for calculating the column region.

Figure 17A:
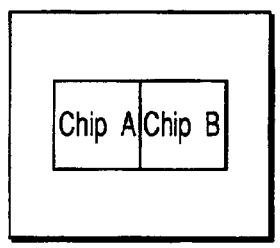
FIGS. 17A to 17C are diagrams for explaining the column region generation according to the fifth embodiment.
Figure 17B:
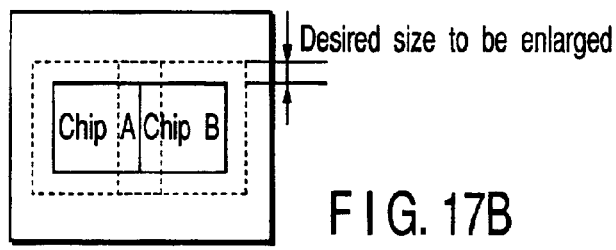
Figure 17C:
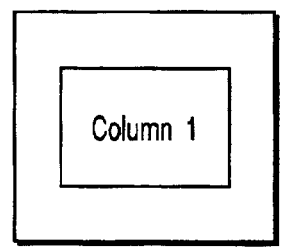
Figures 20A, 20B:
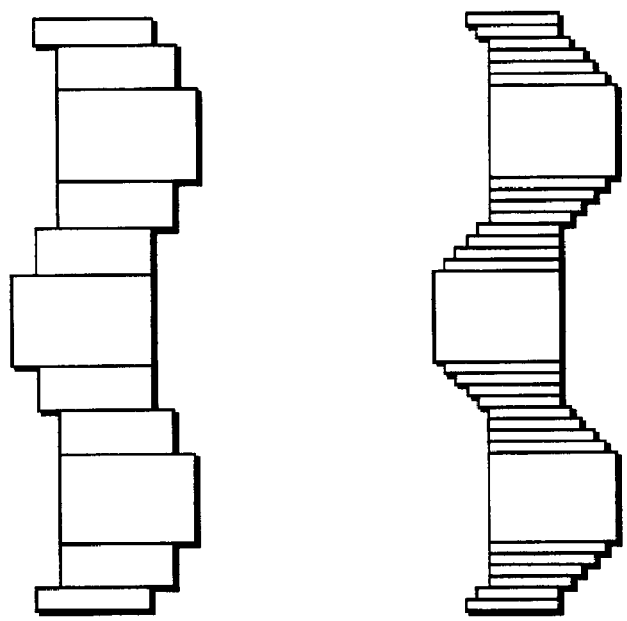
FIGS. 20A and 20B show examples of segmenting a pattern into a number of fine elements.

This method is used for inspecting the chip peripheral regions of the photomask formed by the design data shown in FIG. 17A, for example, together with the chips. The region of the chip included in the design data is magnified by a desired size as shown in FIG. 17B. The column region is formed as shown in FIG. 17C similarly to the above embodiments.

(Sixth Embodiment)

A column region generating method of the sixth embodiment will be described with reference to FIGS. 18A to 18E.

The present embodiment provides a method of realizing a process for processing at a time the peripheral parts of the different kinds of chips included in the design data without remaking the design data by means of the column region operation for calculating the column region.

When the chip peripheral region of the photomask formed by the design data shown in FIG. 18A is inspected, the column region is formed by magnifying the chip region by a desired size. However, since the design data includes different kinds of chips, the column region is formed for each of the chips of the same kind as shown in FIG. 18B similarly to the second embodiment. Since the chip region is magnified, the column region superimposes on the different kind of chip. In order to avoid the superimposition, the different kind of chip region is subtracted from the column region as shown in FIG. 18C. In this state, the different kind of chip is not included in the column region by this status. Therefore, the process of this embodiment can be executed. However, the column region is superimposed on the peripheral part of the chip, so that the part to be processed doubly occurs. For the purpose of avoiding this situation, the column region on the chip B side is subtracted from the column region on the chip A side as shown in FIG. 18D. The result is supposed with the column region on the chip A side. The column region on the chip A side may be subtracted from the column region on the chip B side. The column region (columns 1, 3 and 5) on the chip A side and the column region (column 2 and column 4) on the chip B side are supposed with an actual column region as shown in FIG. 18E.

(Seventh Embodiment)

Figure 19:
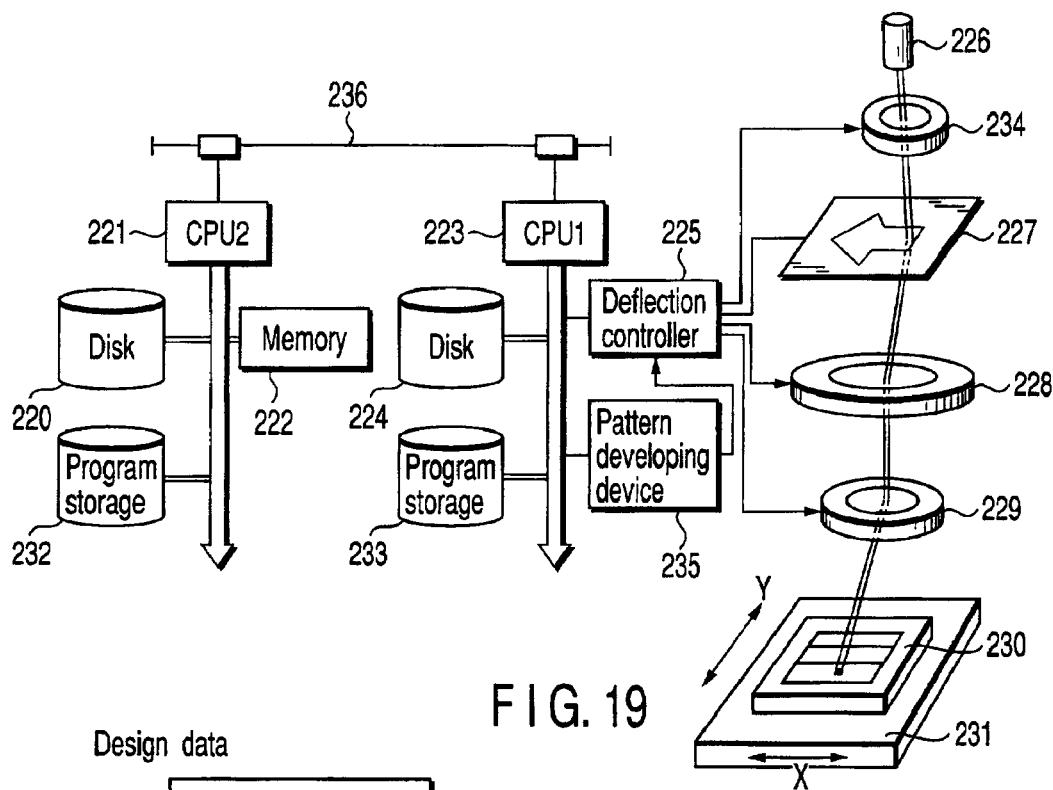
FIG. 19 is a diagram of a pattern drawing apparatus according to the seventh embodiment.

FIG. 19 shows the entire configuration of the pattern drawing apparatus according to the seventh embodiment of this invention.

The design data to be drawn is stored in the magnetic disc 220. The design data is expressed as a plurality of chips divided from one mask similarly to the embodiment of the above pattern inspection apparatus. A serial process of the data converting method of the above embodiment of the present invention is executed with software (program) 232 on a special-purpose computer (CPU 2) 221 for processing pattern data other than the computer (CPU 1) 223 for controlling the entire sections of the apparatus.

Drawing of a pattern is performed by irradiating the charged particle beam emitted from an electron beam source 226 and shaped by an aperture 227 to a mask 230 via a main deflector 228 that can deflect it relatively large and a subsidiary deflector 229 that can deflect it relatively small and in high-speed. The mask 230 is put on the stage 231 movable in X and Y directions, moved to one way (X direction in the drawing) by the stage 231, and moved stepwise in the perpendicular direction (Y direction in the drawing) at the end of the continuous movement. Thus, the beam can irradiate the entire surface of the mask.

The computer 221 reads design data stored in the magnetic disc 220, to process the design data in accordance with the first to sixth embodiments. The apparatus strip data generated by the steps of generating the column region, generating the strip region and generating the strip data are transferred to a magnetic disc 224 connected to a computer 223 for controlling the drawing apparatus. The computer 223 reads the apparatus strip data from the magnetic disc 224 to subject it to pattern converting process in drawing, and reads pattern information such as shape of the pattern, position thereof, and length of the side thereof, and sends it to the deflection controller 225.

An interface 236 through which the computer 221 writes data in the magnetic disc 224 connected to the computer 223 makes use of a general-purpose network such as Ethernet. However, it may be a dedicated interface, means for sharing with the disk, or cross call means.

Such the pattern drawing apparatus can generate drawing data suitable for the apparatus by reconfiguring adjacent rectangular regions in the column regions penetrated in a definite direction by region operation, segmenting the column region into the apparatus strips that are strip regions each having a given width, and extracting, every apparatus strip, unit information described in hierarchy that constructs the design data, in turn. For this reason, the pattern drawing apparatus need not remake the design data, can reduce the shuttle time of the stage as much as possible, and improve a drawing throughput.

Since the data converting region can be changed in the region operation of the column region, the remaking of the design data is not necessary when the process for restricting the region, process for excluding the region, process for magnifying the region, and so on are carried out.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A pattern data converting method for generating pattern data using design data representing plural rectangular regions, the method comprising:

reconstructing the design data into a column region penetrating through adjacent ones of the rectangular regions in a column direction by a region operation for matching the adjacent ones of the rectangular regions with each other in length;

segmenting the column region into apparatus strips; and extracting unit data of the design data for each of the apparatus strips capable of being processed in a time, reconstructing the design data including:

defining a rectangular region start code having first and fourth vertex coordinates (X1, Y1) and (X1, Y2) and a rectangular region end code having second and third vertex coordinates (X2, Y1) and (X2, Y2) to the rectangle regions, where the column direction is X and a direction perpendicular to the column direction X is Y, and the first to fourth vertex coordinates of each of the rectangular regions are (X1, Y1), (X2, Y1), (X2, Y2) and (X1, Y2), collating the rectangular region start code and the rectangular region end code of each of the rectangular regions with the Y coordinate of first to fourth vertexes of the other of the rectangular regions, dividing the rectangular regions at the Y coordinate of the other of the rectangular regions, and subjecting the rectangular region start code and rectangular region end code having the same Y coordinate to an operation, to obtain the column region.

2. A data converting method according to claim 1, wherein each of the rectangular regions corresponds to a chip region.

3. A data converting method according to claim 2, wherein reconstructing the design data includes subjecting chips having different data generation conditions to the region operation as other column.

4. A data converting method according to claim 2, wherein reconstructing the design data includes designating a region to be actually converted to the region on which chips of the design data are arranged, to reconstruct the column region.

5. A data converting method according to claim 2, wherein reconstructing the design data includes designating a region to be not converted and a chip to be not converted to a region on which chips of the design data is arranged, to reconstruct the column region.

6. A data converting method according to claim 2, wherein reconstructing the design data includes enlarging the column region by subjecting the chip and a peripheral portion of the chip to the region operation, to reconstruct a region including the peripheral portion of the design data.

7. A pattern data converting method for generating pattern data having a desired strip width using design data representing plural rectangular regions, the method comprising:

reconstructing the design data into a column region penetrating through adjacent ones of the rectangular regions in a column direction by a region operation for matching the adjacent ones of the rectangular regions with each other in length;

segmenting the column region into apparatus strips; and extracting unit data of the design data for each of the apparatus strips capable of being processed in a time, reconstructing the design data including:

defining a rectangular region start code having a first or fourth vertex coordinate (X1, Y1) or (X1, Y2) and a Y distance between first and second vertexes of the rectangular region, and a rectangular region end code having a second or third vertex coordinate (X2, Y1) or (X2, Y2) and a Y distance between first and second vertexes to all of the rectangle regions, where the column direction is X and a direction perpendicular to this direction X is Y, and first to fourth vertex coordinates of each of the rectangular regions are (X1, Y1) (X2, Y1) (X2, Y2) and (X1, Y2) from the first of each rectangular region, collating the rectangular region start code and the rectangular region end code of each of the rectangular regions with the Y coordinate of first to fourth vertexes of the other of the rectangular regions, dividing the rectangular regions at the Y coordinate of the other of the rectangular regions, and subjecting the rectangular region start code and rectangular region end code that are equal in a Y dimension, and equal in a Y direction position substantially to an operation, to obtain the column region.

8. A data converting method according to claim 7, wherein each of the rectangular regions corresponds to a chip region.

9. A pattern inspection apparatus which inspects a pattern of an object comprising:

a pattern data generator configured to generate pattern data corresponding to the pattern of the object;

a reference data generator configured to generate reference pattern data based on design data; and a comparator which compares the pattern data with the reference pattern data to inspect a defect of the pattern of the object, the reference data generator including:

means for reconstructing the design data into a column region penetrating through adjacent ones of the rectangular regions in a column direction by a region operation for matching the adjacent ones of the rectangular regions with each other in length;

means for segmenting the column region into apparatus strips; and means for extracting unit data of the design data for each of the apparatus strips capable of being processed in a time, the means of reconstructing the design data including:

means for defining a rectangular region start code having first and fourth vertex coordinate (X1, Y1) and (X1, Y2) and a rectangular region end code having second and third vertex coordinates (X2, Y1) and (X2, Y2) to the rectangle regions, where the column direction is X and a direction perpendicular to the column direction X is Y, and the first to fourth vertex coordinates of each of the rectangular regions are (X1, Y1), (X2, Y1), (X2, Y2) and (X1, Y2), means for collating the rectangular region start code and the rectangular region end code of each of the rectangular regions with the Y coordinate of first to fourth vertexes of the other of the rectangular regions, means for dividing the rectangular regions at the Y coordinate of the other of the rectangular regions, and means for subjecting the rectangular region start code and rectangular region end code having the same Y coordinate to an operation, to obtain the column region, and the pattern data generator including a stage on which the object is put, and a moving device which moves the stage to scan a region of the object which corresponds to the column region.

10. A pattern inspection apparatus according to claim 9, wherein each of the rectangular regions corresponds to a chip region including a chip.

11. A pattern inspection apparatus according to claim 10, wherein the means for reconstructing the design data includes means for subjecting chips having different data conditions to the region operation as other column.

12. A pattern inspection apparatus according to claim 10, wherein the means for reconstructing the design data includes means for designating a region to be actually converted to the region on which the chip of the design data is arranged or the column region, to reconstruct the column region.

13. A pattern inspection apparatus according to claim 10, wherein the means for reconstructing the design data includes means for designating a region to be not converted and a chip to be not converted to a region on which the chip of the design data is arranged or the column region, to reconstruct the column region.

14. A pattern inspection apparatus according to claim 10, wherein the means for reconstructing the design data includes enlarging the column region by subjecting the chip and a peripheral portion of the chip to the region operation, to reconstruct a region including the peripheral portion of the design data.

15. A drawing apparatus which draws a pattern on an object, comprising:

a design data generator configured to generate design data including plural data representing plural rectangular regions;

a reconstructing device configured to reconstruct the design data into column regions penetrating through adjacent ones of the rectangular regions in a column direction by a region operation for matching vectors of the adjacent ones of the rectangular regions with each other in length;

a segmenting device configured to segment the column region into apparatus strips;

an information extracting device configured to extract unit information of hierarchical description that constructs the design data for each of a plurality of apparatus strips capable of being processed in a time, to form pattern data having a desired strip width; and a drawing device configured to draw a pattern corresponding to the design data according to the pattern data on the object, the reconstructing device including:

means for defining a rectangular region start code having first and fourth vertex coordinate (X1, Y1) and (X1, Y2) and a rectangular region end code having second and third vertex coordinates (X2, Y1) and (X2, Y2) to the rectangle regions, where the column direction is X and a direction perpendicular to the column direction X is Y, and the first to fourth vertex coordinates of each of the rectangular regions are (X1, Y1), (X2, Y1), (X2, Y2) and (X1, Y2), means for collating the rectangular region start code and the rectangular region end code of each of the rectangular regions with the Y coordinate of first to fourth vertexes of the other of the rectangular regions, means for dividing the rectangular regions at the Y coordinate of the other of the rectangular regions, and means for subjecting the rectangular region start code and rectangular region end code having the same Y coordinate to an operation, to obtain the column region, and the drawing device including a stage on which the object is put, and a moving device which moves the stage to scan a region of the object which corresponds to the column region.

16. A drawing apparatus according to claim 15, wherein each of the rectangular regions corresponds to a chip region.

17. A drawing apparatus according to claim 16, wherein the reference pattern generator includes means for subjecting chips having different data conditions to the region operation as other column.

18. A drawing apparatus according to claim 16, wherein the reconstructing means includes means for designating a region to be actually converted to the region on which the chip of the design data is arranged or the column region, to reconstruct the column region.

19. A drawing apparatus according to claim 16, wherein the reconstructing means includes means for designating a region to be not converted and a chip to be not converted to the region on which the chip of the design data is arranged or the column region, to reconstruct the column region.

20. A pattern inspection apparatus according to claim 16, wherein the reconstructing means includes enlarging the column region by subjecting the chip and a peripheral portion of the chip to the region operation, to reconstruct a region including the peripheral portion of the design data.

* * * * *